United States Patent [19]

Ducret

[11] 4,267,636
[45] May 19, 1981

[54] WELDED ARMORED CABLE CUTTING TOOL

[76] Inventor: Lucien C. Ducret, 8 Apache Pl., Riverside, Conn. 06878

[21] Appl. No.: 70,893

[22] Filed: Aug. 29, 1979

[51] Int. Cl.³ .................... B21F 13/00; B26B 27/00
[52] U.S. Cl. ...................................... 30/90.3; 30/91.1
[58] Field of Search ............... 30/90.4, 90.2, 90.3, 30/90.9, 90.8, 91.1

[56] References Cited

U.S. PATENT DOCUMENTS

| | | | |
|---|---|---|---|
| 2,989,806 | 6/1961 | Davis | 30/90.3 |
| 3,633,275 | 1/1972 | Hutchinson | 30/90.3 |
| 3,851,387 | 12/1974 | Ducret | 30/91.1 |
| 4,142,290 | 3/1979 | Ducret | 30/90.3 |
| 4,169,400 | 10/1979 | Ducret | 30/90.3 |

FOREIGN PATENT DOCUMENTS 1261360  4/1961  France ..................... 30/91.1

Primary Examiner—Nicholas P. Godici
Assistant Examiner—J. T. Zatarga
Attorney, Agent, or Firm—DeLio & Montgomery

[57] ABSTRACT

A tool for cutting longitudinal slits in welded armored cable, applicable to cables in a wide variety of sizes due to its use of a wide angled cable guide which can be adjusted laterally within a small range in order to center widely varying sizes of cables in line with the saw.

5 Claims, 7 Drawing Figures

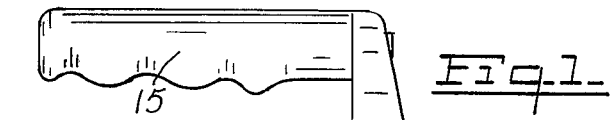
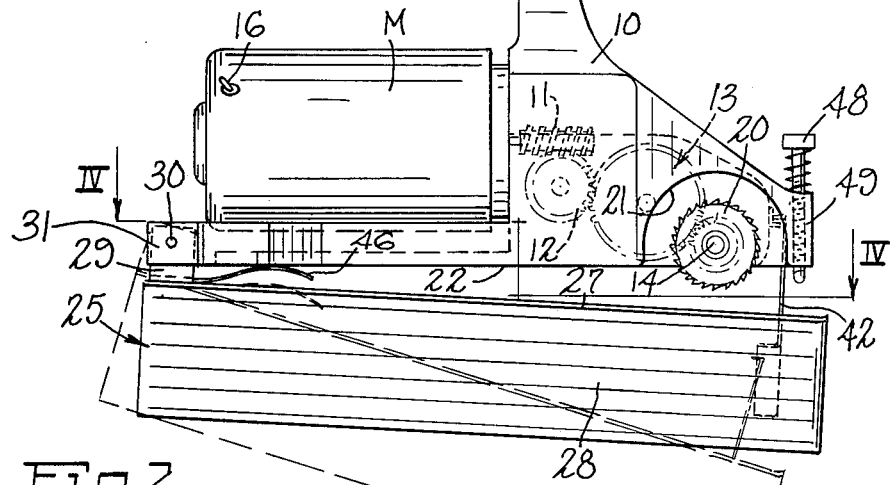
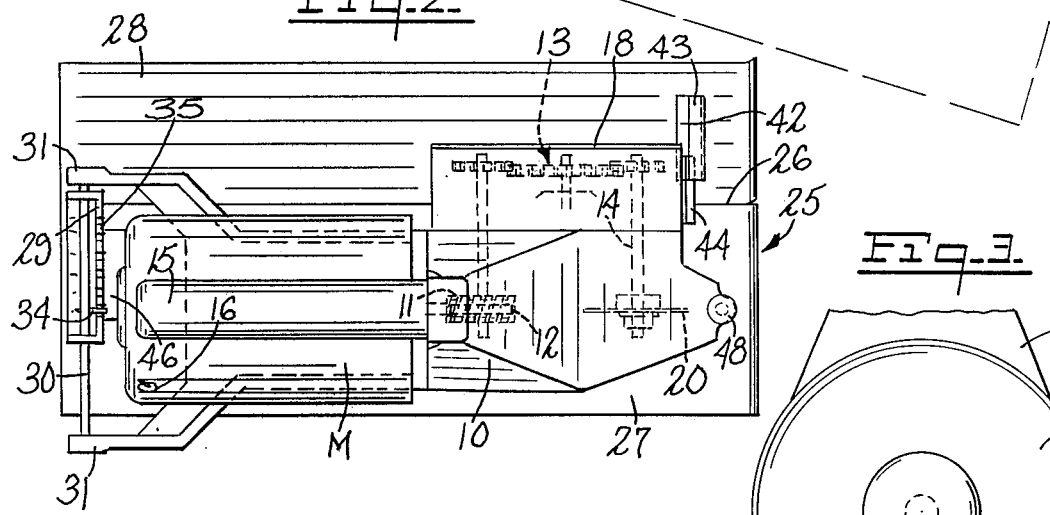
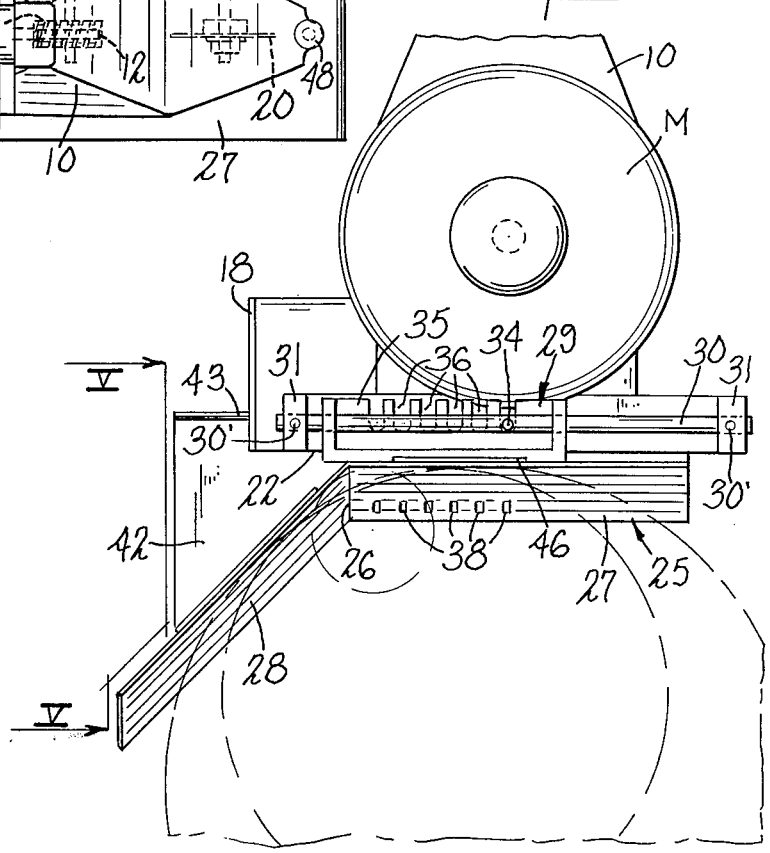

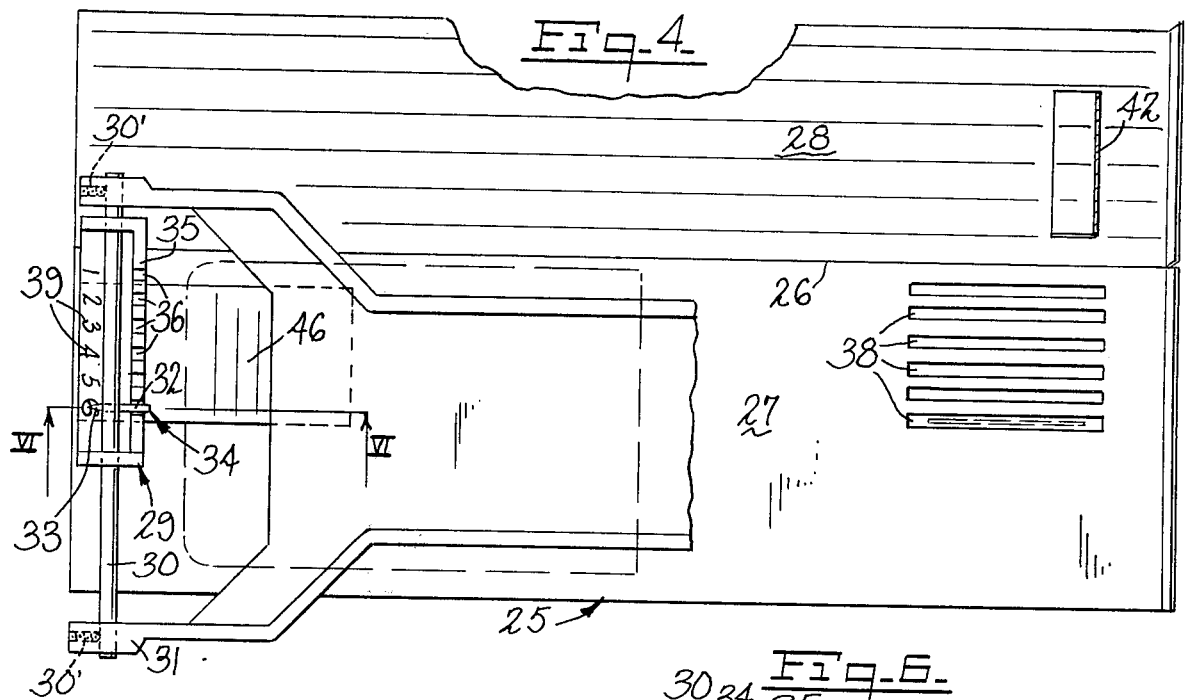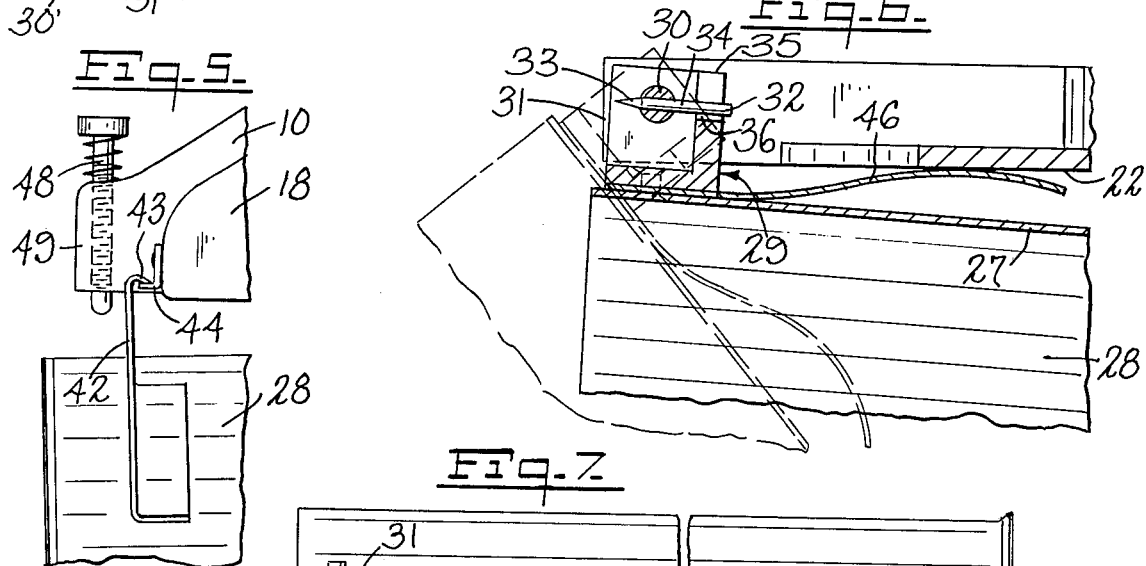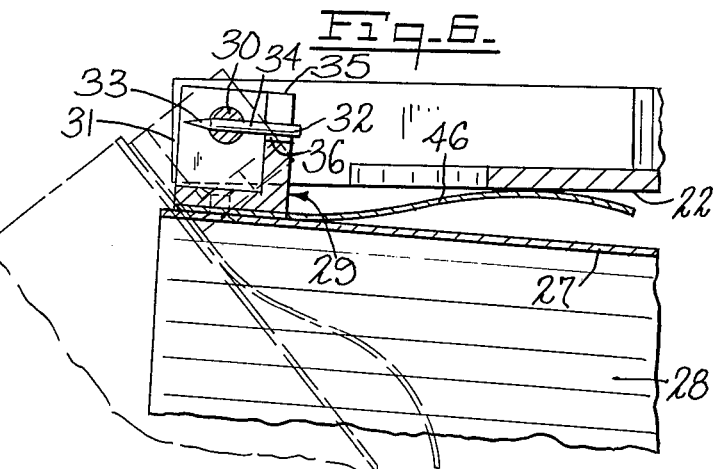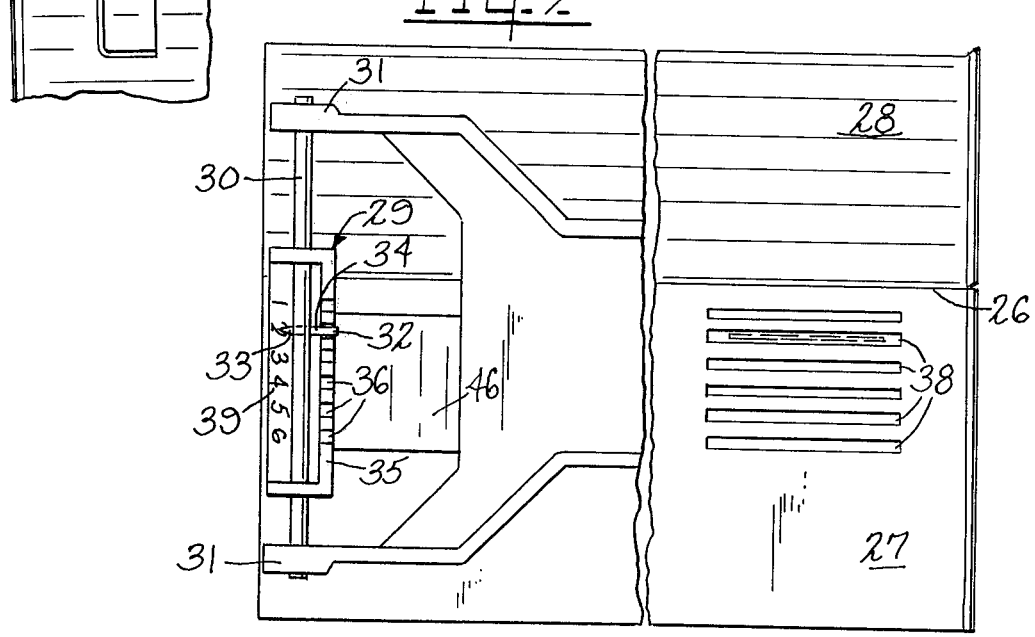

WELDED ARMORED CABLE CUTTING TOOL

This invention relates to a cable cutting tool, and particularly to a hand-held power tool for cutting longitudinal slits in welded armored cable, in a wide range of sizes.

Armored electrical cable of the welded type normally comprises a metal tube having a welded seam, the tube having circular or spiral corrugations and sometimes a plastic jacket, as in the so-called CLX cable. Such cable comes in a range of sizes up to six inches in diameter, or larger, and exhibits great strength and durability with a sacrifice of flexibility. Problems are presented in connection with the cutting and skinning of short or longer sections of the cable, as where the conductor elements must be more or less exposed for splicing or connection to terminals or other devices.

It is important to be able to cut the shielding or armor accurately to a predetermined depth such that the cutting blade does not touch the cable materials within the shielding, this requiring the cutting blade to be maintained in a fixed relationship to the cable during the cutting operations. Whereas the cutting of a BX cable can be effected with the cable clamped rigidly in the cutting tool, as in applicant's U.S. Pat. No. 3,851,387, Dec. 3, 1974, a welded armor can be cut effectively only by a tool which travels along the cable and makes an elongated incision or slit, as a first step in rendering a section of shielding or armor removable. A hand crank actuated tool for this purpose is shown in applicant's Pat. No. 4,142,290, Mar. 6, 1979, said tool being suitable for use on cables up to about two inches in diameter, and leaving unfilled the need for a tool capable of operating on larger cables.

It is accordingly an object of the present invention to provide a tool which includes a cable guide applicable, without modification, to cables in a wide range of sizes, in combination with a power driven cutting saw which is laterally adjustable relative to the cable guide for placement instantly in proper position to cut radially the armor on each size of cable.

It is a further object of the invention to provide a tool having a readily accessible and observable means for adjusting the depth of cut.

It is another object of the invention to provide a tool wherein the saw blade is fully guarded during operation but can easily be removed and replaced by blades of the same or a different diameter.

It is a still further object of the invention to provide a tool wherein the cable guide is readily removable for replacement by a flat base to cut flat stock.

It is yet another object of the invention to provide certain improvements in the form, construction and arrangement of the several parts whereby the above-named and other objects may effectively be attained.

The invention accordingly comprises the features of construction, combination of elements, and arrangement of parts which will be exemplified in the combination hereinafter set forth, and the scope of the invention will be indicated in the claims.

A practical embodiment of the invention is shown in the accompanying drawings, wherein:

FIG. 1 represents a side elevation of the tool, the released position of the cable guide being shown in broken lines;

FIG. 2 represents a top plan view of the tool;

FIG. 3 represents an end elevation of the tool, from the left of FIG. 1;

FIG. 4 represents a horizontal section on the line IV—IV of FIG. 1;

FIG. 5 represents a detail side elevation showing the guide latch and depth adjustment screw on a larger scale than in FIG. 1 and from the direction of the line V—V in FIG. 3;

FIG. 6 represents a detail vertical section on the line VI—VI of FIG. 4; and

FIG. 7 represents a horizontal section, as in FIG. 4, showing the cable guide adjusted to a different position.

Referring to the drawings, the tool includes a chassis 10 on which is mounted an electric motor M, connected by a worm 11 and worm gear 12 to the gear train 13 which drives the saw shaft 14 journaled in the forward portion of the chassis. The operating handle 15, extends horizontally above the motor and a switch 16 may be located adjacent the motor or in the handle. The gear train is enclosed within a protective cover 18 while the saw blade 20 is located within the arched recess 21, and substantially on the center line, longitudinally, of the chassis. The saw shaft 14 is located close enough to the flat base 22 of the chassis to enable an appropriately sized circular saw to project downwardly some distance further than normal cutting depth, while the recess 21 is of a size to accommodate over-sized saws, if desired.

The cable guide 25 consists primarily in a flat rectangular sheet folded longitudinally on the line 26 to form an upper panel 27 and a side panel 28 lying at an angle of 135 degrees. At its rear end (with respect to the direction of movement during operation) the panel 27 is provided with a wide yoke 29, the upstanding ends of which are journaled on a cross-shaft 30 which is about twice as long as the yoke and is mounted fixedly in posts 31 on the base of the chassis. The shaft 30 is traversed, at a point about midway of its length, by an indexing pin 34, lying in a plane parallel to the base 22 with one end 32 projecting forwardly and its other end formed as a rearwardly directed pointer 33.

The yoke 29 may conveniently be integral with a transversely disposed adjusting comb 35, the teeth of which project upwardly and leave spaces 36, in each of which the end 32 of the pin may be engaged (FIGS. 4 and 7).

Adjacent its opposite (front) end, the panel 27 is traversed by a plurality of parallel slots 38, six being shown, each being proportioned to permit free passage of the saw blade for a distance corresponding to its maximum cutting depth. The positions of the slots 38, spaces 36 in the comb, and the pin 34 are so coordinated that each pin-space engagement corresponds to the placement of a selected slot in line with the saw. Lateral adjustment of the cable guide is effected by swinging it downward, 45 degrees or so as shown in FIG. 6, to bring the top of the comb below the level of the pin, sliding the guide to locate a selected space 36 opposite the pin, and swinging the guide upward again in the desired adjusted position. Calibrations 39 opposite the respective spaces indicate the size of cable to which each setting is applicable.

A latch plate 42 is shown as being mounted on the upper surface of panel 28, projecting upward and having a rearwardly bent lip 43, shaped to snap into engagement with the forwardly projecting catch 44 mounted on the front end of the chassis, as shown in FIG. 5. The plate 42 is of spring material and has a height such that the cable guide normally rests in a position slightly below the edge of the saw, i.e., so that the saw blade is not projecting through any slot 38, as shown in full lines in FIG. 1. The guide is biased into this protective position by a leaf spring 46, shown in FIG. 6 as being welded or riveted to the panel 27 adjacent the yoke 29, in a position to bear against the base 22 of the chassis when the latch is closed. The latch can be manually opened for lowering of the guide to its "adjusting" position, shown in broken line in FIG. 6.

The adaptability of this tool, and particularly its specially proportioned cable guide, to a wide range of cable sizes is demonstrated by the circular lines beneath FIG. 3. The axis of a cable which is located in the angle formed by the fold 26 will necessarily lie in the plane bisecting that angle. Thus, increases in diameter of the cable only serve to displace the respective axes along such a bisecting plane, and the surface of a six-inch diameter cable will be tangent to the surface of panel 27, along the line where it is traversed by the last saw slot 38 (see FIG. 4), when the guide has been adjusted no more than one inch from its position for cutting a one- or two-inch cable (see FIG. 7).

The depth of cut is adjustably limited by the provision of set screw 48, threaded into the extension 49 on the front end of the chassis, the lower end of the screw being adapted to make contact with the upper surface of the panel 27, preferably in the plane of the saw blade, to prevent rocking of the cable guide.

In operation, the cable to be cut is firmly supported on a bench and/or in a vice or jig, short lengths of such cables being quite rigid. The cable guide is adjusted laterally to the position indicated for the size of cable to be cut, the cable guide portion ahead of the blade is placed on the cable and downward pressure is exerted to bring the tool chassis down toward the guide as far as the depth stop will permit; the motor is started and the tool is pushed along the cable to slit the armored jacket. Welded armored cables must be slitted on opposite sides (two slits, 180 degrees apart) to facilitate removal of the jacket.

The cross shaft 30 is preferably removable, as by releasing set screws 30', so that the cable guide can be removed and replaced, if desired, by a flat base for cutting flat stock, with or without use of the depth control screw.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What I claim is:

1. A cutting tool for making an axially extended incision in the surface of an armored cable comprising, a chassis having a substantially flat lower surface, means supporting a circular saw blade on the chassis in a position such that the blade's periphery projects below the plane of said lower surface, a motor on the chassis and a gear train connecting the motor to the saw blade, in combination with a cable guide constituted by an upper flat panel and a side flat panel, the panels lying in planes which intersect at a wide angle, the upper panel being pivotally secured to the chassis at a point remote from the saw and being provided with a plurality of parallel elongated openings dimensioned and laterally disposed to permit passage therethrough of the periphery of the saw blade, the path of pivotal movement of the cable guide being toward and away from the lower surface of the chassis, and said openings lying parallel to the line of intersection of the panels, spaced at different distances therefrom, and spaced from the pivot point of the panel a distance equal to the spacing of the saw from said pivot point, and means associated with the pivot point of the panel for holding the cable guide selectively in different laterally adjusted positions corresponding to registry of the saw blade selectively with each elongated opening.

2. A cutting tool according to claim 1 wherein the cable guide is pivoted on a cross-shaft removably mounted on the chassis, the cross-shaft being traversed diametrically by the pin, both ends of which project from the shaft, the comb being mounted on the cable guide in a position to permit engagement of one projecting end of the pin in a selected notch of the comb, and the opposite projecting end of the pin serving as a pointer to relate the adjusted position of the cable guide to calibrations on the cable guide.

3. A cutting tool according to claim 1 which includes a releasable latch for retaining the cable guide in proximity to the lower surface of the chassis but below the edge of the saw blade, and means biasing the guide away from said lower surface.

4. A cutting tool according to claim 1 wherein the guide holding means includes a comb having teeth defining spaced notches, a pin engageable in a selected notch, and means associated with the pivot point of the panel supporting said comb and pin for relative movement.

5. A cutting tool according to claim 4 wherein the comb is mounted on the cable guide and the pin is fixed relative to the chassis.

* * * * *